United States Patent [19]

McDaniel et al.

[11] Patent Number: 4,481,302

[45] Date of Patent: Nov. 6, 1984

[54] CHROMIUM ON MIXED METAL PHOSPHATE BASE WITH ORGANOBORON COCATALYST

[75] Inventors: Max P. McDaniel; Marvin M. Johnson, both of Bartlesville, Okla.

[73] Assignee: Phillips Petroleum Company, Bartlesville, Okla.

[21] Appl. No.: 461,318

[22] Filed: Jan. 27, 1983

[51] Int. Cl.$^3$ .............................. C08F 4/02; C08F 4/62
[52] U.S. Cl. ..................................... 502/150; 502/210; 526/134; 526/156; 526/352
[58] Field of Search ........................ 502/204, 210, 150

[56] References Cited

U.S. PATENT DOCUMENTS

| | | | |
|---|---|---|---|
| 3,342,750 | 9/1967 | Kearby | 252/437 |
| 3,904,550 | 9/1975 | Pine | 252/437 |
| 4,080,311 | 3/1978 | Kehl | 252/437 |
| 4,173,548 | 11/1979 | Pullukat et al. | 526/106 |
| 4,219,444 | 8/1980 | Hill et al. | 252/435 |
| 4,364,841 | 12/1982 | McDaniel et al. | 526/134 |
| 4,364,842 | 12/1982 | McDaniel et al. | 502/150 |
| 4,364,854 | 12/1982 | McDaniel et al. | 502/210 |
| 4,364,855 | 12/1982 | McDaniel et al. | 502/210 |

*Primary Examiner*—P. E. Konopka
*Attorney, Agent, or Firm*—French and Doescher

[57] ABSTRACT

A catalyst system suitable for olefin polymerization comprising a mixed phosphate base made up of 75-99 mole percent aluminum phosphate and 1 to 25 mole percent of a phosphate of at least one other metal selected from gallium, yttrium, zirconium, lanthanum, neodymium and thorium in conjunction with an organoboron cocatalyst. The resulting catalyst system is capable of giving ethylene polymer having relatively low melt index and at the same time exhibits great sensitivity to molecular weight control agents so as to enable the production of a broad spectrum of polymers so far as melt index is concerned from a single catalyst system.

16 Claims, No Drawings

CHROMIUM ON MIXED METAL PHOSPHATE BASE WITH ORGANOBORON COCATALYST

BACKGROUND OF THE INVENTION

This invention relates to olefin polymerization catalysts.

Aluminum phosphate alone or with various other metals is known as a hydrocarbon conversion catalyst. Aluminum phosphate is also known as a base for chromium in olefin polymerization reactions. With chromium on silica olefin polymerization catalysts, it has been found that a more economical route to olefin polymerization is to utilize a slurry system for the polymerization. This, however, produces relatively low melt flow polymer because it is not feasible to raise the temperature in order to increase the melt flow as is the case in solution systems. Thus, much technology has developed on methods to raise the melt flow in catalyst systems utilizing chromium on silica. Recently, it has been discovered that chromium on aluminum phosphate can be utilized to produce olefin polymers having high melt flow. Here again, with the slurry system, there is very little leeway in controlling melt flow through temperature control. Consequently, chromium on aluminum phosphate may result in the production of polymer which has a greater melt flow than is desired and this cannot be reduced as a practical matter by reducing the temperature. Thus, there is a need for increasing the flexibility of molecular weight control in chromium on aluminum phosphate catalyst systems.

SUMMARY OF THE INVENTION

It is an object of this invention to provide an improved phosphate base for a chromium olefin polymerization catalyst;

It is a further object of this invention to provide an olefin polymerization catalyst with greater sensitivity to molecular weight control agents such as hydrogen;

It is a further object of this invention to provide a broad spectrum of polymers so far as molecular weight is concerned from a single catalyst system; and It is a further object of this invention to provide an improved phosphate base catalyst system.

In accordance with this invention, aluminum phosphate is formed with 1 to 25 mole percent of a phosphate of at least one metal selected from gallium, yttrium, zirconium, lanthanum, neodymium and thorium. The resulting cogel is used as a base for chromium olefin polymerization catalysts in conjunction with an organoboron cocatalyst.

DESCRIPTION OF THE PREFERRED EMBODIMENTS

The base is a combination of aluminum phosphate and a phosphate of at least one other metal selected from gallium, yttrium, zirconium, lanthanum, neodymium and thorium. The aluminum phosphate constitutes 75 to 99 mole percent of the base, preferably 80 to 95 mole percent, the remainder, 1 to 25, preferably 5 to 20 mole percent being of the other metal phosphate or phosphates.

Any suitable method can be used to prepare the base. Three suitable methods are set out hereinafter. First, conventional techniques for preparing aluminum phosphate as disclosed in Hill et al, U.S. Pat. No. 4,219,444, the disclosure of which is hereby incorporated by reference can be used. In this method, mixed metal salts are combined with a source of phosphate ions in an aqueous medium and neutralized with a neutralizing agent (such as ammonia) to give a hydrogel. The neutralizing agents which can be used are described in more detail hereinafter. Alternatively, a polar organic solvent can be used. The metal salts are, thus, salts of aluminum and salts of at least one other metal selected from gallium, yttrium, zirconium, lanthanum, neodymium and thorium. The second method for forming the base of the catalyst system of this invention is to combine alkoxides (of the same metals as set out above) with phosphoric acid to give a hydrogel directly, as disclosed with regard to aluminum phosphate in Pine, U.S. Pat. No. 3,904,550, the disclosure of which is hereby incorporated by reference. Third, salts of the metals which will melt can be used, with the source of phosphate ions combined with the melt and then neutralized to give the hydrogel. Generally those aluminum salts with a sufficiently low melting point are hydrated. Orthophosphoric acid, orthophosphates such as monoammonium phosphate and diammonium hydrogen phosphate or mixtures of monoammonium and diammonium phosphate are preferred sources of phosphate ions. The scope of the phosphate ion source can be the same as in the first method. In a variation of this third method, a concentrated syrup of the metal salts is used. Thus, the third method can be broadly viewed as employing a concentrated mass of the acid phase (source of metals and source of orthophosphate ions). Alternatively, in method three and possibly method one, the metal phosphate composition can be only partially neutralized and allowed to sit as a strongly acid composition until gelation occurs spontaneously.

In the preparations involving an aqueous medium, it is preferred to remove water by azeotropic distillation or by washing with a volatile, water miscible, low surface tension organic liquid. In the techniques not employing water or a solvent, any small amount of water carried over from water of hydration or from the base used in the neutralization can be removed by conventional spray drying, tray drying or oven drying, thus avoiding the necessity for azeotropic distillation. However, even in these situations, if it is desired to water wash the hydrogel to remove soluble impurities, then azeotropic distillation or washing with a volatile oxygen containing water miscible solvent is desirable. After removal of water in this manner, the gel is preferably dried of solvent under mild conditions, for instance by heating at a temperature of 25° to 110° C., most preferably under vacuum.

It may be desirable in some instances to coprecipitate other materials with the phosphates or have other materials present during the gelation. For instance, the chromium compound such as chromium nitrate can be introduced with the reactants, as can a silicon component such as $Si(OEt)_4$.

It is frequently preferred that a small amount of a boron compound such as $B(OH)_3$ be introduced into the melt to be coprecipitated with the metal phosphates. Other suitable boron compounds include borates such as ammonium borate. By coprecipitated as it relates to the boron compound, it is meant that the metal phosphates are formed into a true hydrogel in the presence of the boron compound. It is not known to what extent the borate becomes incorporated into the hydrogel structure. The amount of boron compound present when the metal phosphates are gelled can vary widely but it is generally used in an amount so as to give about 1 to 30 mole percent boron compound based on the moles of phosphates.

The neutralization in the first and third methods can be carried out either by adding the acid phase (mixed metal salts and source of phosphate ions) to the base phase (neutralizing agent) or vice versa (or by adding both to a third vessel). One suitable practice is to drip the acid phase into the base phase. This results in the production of small spheres or balls of the orthophosphates, particularly with the third method where the melt of metal salt or salts and source of phosphate ions is dripped or sprayed or otherwise slowly added to a large excess of ammonium hydroxide. The spheres are subsequently collected, washed, dried and calcined.

Gelation occurs spontaneously at a pH of about 2-4, which is achieved by combining about 72 percent of the neutralizing agent, and it has been found, particularly in technique three, that this is undesirable. Therefore, neutralization is preferably achieved by either: (1) combining slowly with stirring about 72 percent of the amount of neutralizing agent needed for complete neutralization and thereafter quickly adding the rest so as to achieve gelation at a pH of 5 or greater, preferably at least 6, generally 6 to 10, or (2) combining 60 to 70 percent of the neutralizing agent needed for complete neutralization and aging until gelation occurs which will generally be 1 minute to 48 hours, more generally 5 minutes to 10 hours, more generally 10 minutes to 3 hours; thus, gelation occurs at a pH below 4, generally about 2. While any base can be used, concentrated ammonium hydroxide, ammonia gas, or ammonia dissolved in an alcohol or other non-aqueous solvent are preferred. Other suitable neutralizing agents include ammonium carbonate used alone or in combination, ethylene oxide and propylene oxide. Alternatively, in techniques one and three, particularly one, the phosphate can be in the neutralizing agent.

The chromium can be coprecipitated as noted hereinabove or can be added to the hydrogel. For example, a water soluble chromium compound, such as chromium nitrate, chromium acetate, or $CrO_3$ can be added to the hydrogel. Alternatively, a chromium compound soluble in an anhydrous solvent such as hydrocarbon can be used to impregnate the xerogel prior to activation. Suitable chromium compounds for such anhydrous impregnation include tertiary-butyl chromate. The chromium compounds are used in amounts sufficient to give 0.001 to 10, preferably 0.1 to 5, more preferably about 1 weight percent chromium based on the weight of the xerogel base. (The term xerogel is used to refer to the predominantly amorphous gel resulting from the removal of free water from the hydrogel.)

The activation of the thus-formed xerogel can be carried out at a lower temperature than is generally required for activating silica-based chromium catalysts. Temperatures of 150°–800° C., preferably 300°–800° C., more preferably 300°–600° C., are suitable. The activating ambient can be any oxidizing ambient but for convenience and economy, an oxygen-containing ambient such as air is preferred. The chromium is at least predominantly in the hexavalent state after activation. If an excess of chromium over what will bond to the support is used, the excess may not be in the hexavalent state, if it remains on the catalyst at all. Times of 5 minutes to 24 hours, preferably 0.5 to 10 hours, are suitable for the activation or calcining step. The chromium is thought to be reduced in the polymerization zone by the monomer, probably to plus two oxidation state. If desired, this reduction may be carried out before the catalyst is contacted with the monomer, for instance in the activator.

Zerovalent chromium, such as dibenzene chromium or dicumene chromium, can also be used. In such cases, the chromium is added after the base is activated and the composition is used without further high temperature activation in the presence of an oxidizing ambient. Zero-valent chromium can also be used as the chromium source in the embodiments using hexavalent chromium by adding it before calcination. Calcination then converts it to the hexavalent form.

The metals and phosphorus components are selected so as to generally give an atom ratio of phosphorus to total metals within the range of 0.2:1 to 1:1, preferably 0.6:1 to 0.9:1. Ratios above 1 are less desirable because the xerogel tends to be crystalline as opposed to amorphous and because excess phosphorus may deactivate the chromium.

The boron cocatalyst is preferably a trihydrocarbylborane, more preferably a trialkylborane, the alkyl groups preferably having 1 to 12, more preferably 2 to 5, carbon atoms per group. Triethylborane, tripropylborane and tributylboranes are presently believed to be especially preferred. Tri-n-butylborane is presently most preferred because it gives greater melt index (MI) increase than the others tested. Without the cocatalyst, the melt index would be too low for commercial use. The cocatalyst tends to raise it substantially, even to the point of being too high. In accordance with the invention, a low melt index can be achieved and the system is sufficiently sensitive to molecular weight control agents such as hydrogen that substantial leeway is possible with regard to the melt flow of the resulting polymer. Other boron compounds such as boron alkoxides, for instance $B(C_2H_5)_2OC_2H_5$, alkyl haloboron compounds, for instance $BC_2H_5Cl_2$, aryl borons such as triphenylborane and metal aryl borate ($MBR_4$) can also be used.

The boron compound cocatalyst is generally utilized in an amount so as to give an atom ratio of boron to chromium within the range of 0.5:1 to 15:1, preferably 2:1 to 10:1. Based on the solvent if any, these amounts of boron compound cocatalyst correspond to a range of 0.5 to 20, preferably 2 to 10 parts by weight per million parts by weight of the solvent, these amounts being based on the total reactor contents in instances where no solvent is utilized.

The boron-containing cocatalyst can either be premixed with the catalyst or added as a separate stream to the polymerization zone, the latter being preferred.

The catalyst systems of this invention can be further treated in the same manner as chromium on silica catalysts are sometimes given special treatments such as being fluorided or being reduced and reoxidized by, for instance high temperature treatment in CO followed by activation as described herein in an oxidizing ambient.

The catalyst systems of this invention comprising a chromium compound on a predominantly amorphous mixed metal phosphate-containing xerogel base can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers for use with ethylene include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 96 to 99.7 weight ethylene. Propylene, 1-butene, 1-pentene, 1-hexene, and 1-octene are especially preferred comonomers.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in an organic medium and to agitate the mixture to maintain the catalyst in suspension throughout the polymerization process. Other known contacting methods such as fluidized bed, gravitating bed, and fixed bed can also be employed.

The catalyst systems of this invention are particularly suitable for use in slurry polymerization systems to produce a complete spectrum of ethylene polymers so far as melt index is concerned, utilizing a single catalyst. Everything from blow molding grade resins which may require a melt index of as little as 0.1 or less to paper coating and injection molding grade resins which may require a melt index of 20 or greater can be produced from a single catalyst system simply by the use of a molecular weight control agent, such as hydrogen. While hydrogen is known as a molecular weight control agent, the catalyst of this invention displays an extraordinary sensitivity to hydrogen (and has just the right "starting point" melt index) so that by controlling the amount of hydrogen utilized, polymers having a very high molecular weight as indicated by low melt index, through polymers having a very low molecular weight as indicated by high melt index can be obtained.

Further control of melt index can be obtained by the small amount of leeway in temperature control and by the known effect of higher catalyst activation temperature causing the melt index of the resulting polymer to be higher. However, yet a further advantage of this invention is that a single activation temperature for the catalyst and a single polymerization temperature can be utilized and still obtain a broad spectrum of polymers utilizing a single catalyst. By "spectrum of polymers", it is meant that that catalyst can be used to produce a low melt index polymer one time. Then another time, the same type of catalyst can be used to produce a high melt index polymer or anything in between by adjusting other variables such as temperature and amount of hydrogen.

With slurry polymerization of ethylene and predominantly ethylene copolymer systems, the conventional temperature range is generally about 200°–230° F. (93°–110° C.) and the commercial systems are generally run as close to the maximum (i.e., the point at which polymer goes into solution) as possible, i.e., 225° F.±5° F. (107° C.±3° C.) in order to get the highest possible melt index. The catalyst of this invention allows running anywhere within this range including at the low end of the conventional temperature range, i.e., 205° F.±5° F. (96° C.±3° C.) in systems normally employing 225° F. (107° C.).

When hydrogen is used in the prior art, it is generally used at partial pressures up to 120 psia (0.83 MPa), preferably within the range of 20 to 70 psia (0.14 to 0.48 Mpa). Similar amounts are used in accordance with this invention, although because of the high sensitivity to hydrogen, it is possible to use smaller amounts, for instance 10 to 70 psia.

EXAMPLE I

In the following example, a group of metals, yttrium, neodymium and gallium were used in conjunction with aluminum to produce mixed phosphates as chromium catalyst bases. The results show that in comparison with a pure aluminum phosphate control, the resulting catalysts have the capability of giving relatively lower melt flow which can then be increased through the use of molecular weight control agents. In addition, based on runs with pure thorium phosphate and lanthanum phosphate, it is seen that these metals have the same capability. Runs with tin and iron show that other metals are not suitable for various reasons.

The invention runs were prepared as follows:

The yttrium phosphate/aluminum phosphate/chromium was prepared by combining 3 grams of $Y_2O_3$ (0.27 moles Y) dissolved in 10 mL of aqua regia with 500 mL of water and ¼ mole of aluminum nitrate. Then there was added 1/5 mole of orthophosphoric acid and the resulting composition neutralized with 100 mL of ammonium hydroxide to give a precipitate which was filtered, azeotrope dried in isoamyl alcohol and impregnated with chromium acetate. It was then activated at 500° C. in oxygen for 3 hours.

The neodymium phosphate/aluminum phosphate/chromium composition was prepared in the same way using ¼ mole of aluminum nitrate and 4.2 grams $Nd_2O_3$ dissolved in 7 mL of aqua regia. It was activated in oxygen for 3 hours at 500° C.

The gallium phosphate/chromium compositions were prepared as follows: First, the 100% gallium phosphate was prepared by utilizing 30 grams of $Ga(NO_3)_3.4H_2O$, i.e., 0.0915 moles which was mixed in 100 mL of water with 0.0732 (8.4 g) of $NH_4H_2PO_4$. Then 16 mL of concentrated ammonium hydroxide were added to form a gel which was filtered and washed in isopropyl alcohol, filtered again, dried and impregnated with chromium acetate. The 10% gallium phosphate base was made by redissolving 7 grams of the original gallium phosphate in 50 mL of nitric acid and adding 118.2 grams of aluminum nitrate, 32.2 grams of ammonium phosphate and 3.6 grams of chromium nitrate in sufiicient amounts to reprecipitate a catalyst base having 10% gallium phosphate and 90% aluminum phosphate on adding 70 mL of concentrated ammonium hydroxide. The final ratio of phosphorous/total metal was 0.8. They were activated in oxygen for 3 hours at 500° C.

The thorium phosphate/chromium of Runs 5, 6 and 7 was prepared by mixing thorium nitrate in water with a solution of monobasic ammonium phosphate and azeotrope drying in isoamyl alcohol. It was calcined for 3 hours at 400° C., thereafter impregnated with dicumene chromium. The thorium phosphate of Run 8 was prepared by combining 0.21 moles of thorium nitrate in 200 mL of water with 0.17 moles of monobasic ammonium phosphate in 100 mL of water. The thorium and phosphate solutions were added to an empty beaker simultaneously and then 50 mL of concentrated ammonium hydroxide were added to give a precipitate which was washed once in cold water and once in acetone and then calcined in air at 500° C. for 3 hours.

The lanthanum phosphate/chromium composition was made in the same manner as the thorium phosphate of Runs 5, 6 and 7, azeotrope dried, and calcined at 400° C. in an oxygen atmosphere for 3 hours.

The tin phosphate/aluminum phosphate/chromium composition was made by dissolving $SnCl_4 \cdot 5H_2O$ into a melt of $Al(NO_3)_3 \cdot 9H_2O$, monobasic ammonium phosphate and chromium nitrate. This was then dripped into concentrated ammonium hydroxide and the resulting precipitate washed twice in water and once in isopropyl alcohol. It was calcined for 3 hours in oxygen at 500° C.

The iron phosphate/aluminum phosphate/chromium composition was made by combining 0.4 moles of orthophosphoric acid with 0.05 moles of ferric nitrate and 0.45 moles of aluminum nitrate, plus 100 mL of water. Ammonium hydroxide was added until gelation occurred. After azeotrope drying using isoamyl alcohol, a methyl alcohol solution of 1 volume percent chromium acetate was added to give 1 weight percent chromium after activation in air. Activation was at 300° C.

The aluminum phosphate was made simply by combining aluminum nitrate and phosphoric acid and neutralizing to form a gel in dilute solution as is well known in the art.

Ethylene was polymerized at 96° C. in isobutane diluent. In all runs, total reactor pressure was 565 psia. When hydrogen was employed it was used at a partial pressure of 50 psi (0.34 MPa). Triethylborane (TEB), 8 ppm based on reactor contents was used in each run (reactor additive, cocatalyst).

All catalysts contained 1 weight percent chromium as chromium oxide ($Cr^{+6}$) or dicumene chromium ($Cr^\circ$) based on the weight of calcined support plus the chromium compound, as indicated in Table I.

The results are set forth in Table I.

TABLE I

| Run No. | Xerogel[a] Base | Atom[b] Ratio P/Metal | Reactor Additives | Cr Valence | Catalyst Prod. g/g Cat. | Run Time Min. | MI[c] g/10 Min. | HLMI[d] g/10 Min. |
|---|---|---|---|---|---|---|---|---|
| 1 | 10% $YPO_4$ | 0.8 | TEB | +6 | 2440 | 60 | 0.33 | 77 |
| 2 | 10% $NdPO_4$ | 0.8 | TEB | +6 | 1605 | 60 | 0.40 | 101 |
| 3 | 10% $GaPO_4$ | 0.8 | TEB | +6 | 1688 | 60 | 0.15 | 59 |
| 4 | 100% $GaPO_4$ | 0.8 | TEB | +6 | Dead | | | |
| 5 | 100% $Th_3(PO_4)$ | 2.0 | TEB | 0 | 940 | 60 | 0 | 0.10 |
| 6 | 100% $Th_3(PO_4)$ | 2.0 | $H_2$ + TEB | 0 | 795 | 60 | 0.25 | 41 |
| 7 | 100% $Th_3(PO_4)$ | 2.0 | TEB | +6 | Dead | | | |
| 8 | 100% $Th_3(PO_4)_4$ | 0.8 | TEB | 0 | Dead | | | |
| 9 | 100% $LaPO_4$ | 0.8 | TEB | 0 | 14 | 90 | 0 | 0 |
| 10 | 100% $LaPO_4$ | 0.8 | TEB | +6 | 3 | 60 | 0 | 0 |
| 11 | 2% $Sn_3(PO_4)_4$ | 0.8 | TEB | +6 | 945 | 40 | 0.063 | 20 |
| 12 | 10% $FePO_4$ | 0.8 | TEB | +6 | 936 | 45 | 0.53 | 109 |
| 13 | 100% $AlPO_4$ | 0.8 | TEB | +6 | 2960 | 90 | 1.2 | 235 |

| Run No. | Den.[e] g/cc | Flex.[f] Mod. MPa | ESCR[g] $F_{50}$ Hrs. | SA[h] $M^2$/g | Base Pore Volume cc/g Total[i] | Desorption[j] | Vinyl[k] Per 1000 C Atoms | Methyl[k] Per 1000 C Atoms |
|---|---|---|---|---|---|---|---|---|
| 1 | 0.9702 | 1525 | 0 | 257 | 1.72 | 1.50 | | |
| 2 | 0.9700 | 1414 | 0 | 233 | 1.14 | 0.91 | | |
| 3 | | | | | | | | |
| 4 | | | | | | | | |
| 5 | 0.9572 | | | 28 | 0.11 | 0.09 | 4.5 | 3.6 |
| 6 | 0.9605 | | >1000 | 28 | 0.11 | 0.09 | 4.6 | 3.7 |
| 7 | | | | | | | | |
| 8 | | | | 58 | 0.07 | | | |
| 9 | | | | | | | | |
| 10 | | | | | | | | |
| 11 | | 1581 | 0 | | | | | |
| 12 | 0.9725 | 1807 | 0 | 258 | 1.29 | 0.90 | | |
| 13 | 0.9705 | | | 264 | 0.81 | — | 2.7 | 1.9 |

A blank means no determination made.
[a]Remainder is $AlPO_4$, if less than 100%.
[b]Atom ratio of P to metal or metals.
[c]MI = melt index, ASTM D 1238, Condition E.
[d]HLMI = high load melt index, ASTM D.
[e]ASTM D 1505.
[f]ASTM D 790.
[g]ASTM D 1693, Condition A.
[h]B.E.T., $N_2$ sorption.
[i]$N_2$ sorption, total at saturation.
[j]$N_2$ desorption, less than 300 angstroms.
[k]Determined from infrared analysis.

These results show that the xerogel bases containing phosphates of yttrium (Run 1), neodymium (Run 2), and gallium (Run 3) at 10% levels lower the melt index as compared with Control Run 13 which used a base which was entirely aluminum phosphate. Run 4 in comparison with Run 3 shows that with 100% of the metal phosphate other than aluminum phosphate there is a tendency for the productivity to be lowered drastically or even produce a dead catalyst. Thus in Runs 7 and 10, thorium phosphate and lanthanum phosphate give poor productivities. However, these metal phosphates show the same melt index reducing capability as the phosphates of yttrium, neodymium and gallium.

A comparison of the polymer melt index results of Runs 5 and 6 shows the hydrogen sensitivity of the catalyst.

It is not apparent why Run 8 was dead and Run 5 was not. Possibly air was inadvertently introduced into the reactor in Run 8. Also, while a P/metal atom ratio of 1 or less is essential with aluminum phosphate, it may be with the other metal phosphates, particularly thorium, a higher ratio is satisfactory or even desirable, i.e., in the range of 1:1 to 2:1 atom ratio of P/metal for the non-aluminum phosphate portion.

EXAMPLE II

Zirconium phosphate catalyst bases were prepared as follows:

Catalyst #1—To 0.125 mole of $Zr(OBu)_4 \cdot BuOH$ in 300 mL of isopropanol was added 8.6 mL of 85% $H_3PO_4$ (0.125 mole) in 100 mL isopropanol to yield a mushy white precipitate. In these runs Bu is butyl, PV is pore volume in cc/g and SA is surface area in $m^2/g$ (B.E.T.). The precipitate was collected by filtration and dried under vacuum at 80° C. This resulted in recovery of 34 g of precipitate (29 expected for $ZrPO_4OH$; 36.5 expected for $ZrPO_4OBu$). Half of the precipitate was calcined in $O_2$ for 5 hours at 500° C. It then had a gray color. $N_2$ sorption results were as follows: Total PV=0.09 (saturated), SA=39, P/Zr atom ratio=1.

Catalyst #2—To 0.126 mole of $Zr(OBu)_4 \cdot BuOH$ in 300 mL isopropanol was added 13.0 mL (0.189 mole) of 85% $H_3PO_4$ in 100 mL isopropanol to yield a white mushy precipitate. This was filtered off and dried under vacuum at 80° C., then screened and calcined in $O_2$ at 500° C. for 5 hours. $N_2$ sorption results were as follows: Total PV 0.20 (saturated), SA=55, P/Zr atom ratio=1.5.

Catalyst #3—Solution A=0.2 mole $ZrO(NO_3)_3$ in 300 mL $H_2O$. Solution B=0.2 mole $(NH_4)_2HPO_4$ in 300 mL $H_2O$. Both A and B were added simultaneously to a 1 L beaker containing 300 mL $H_2O$ to yield a mushy white precipitate. The filtrate consituted 720 mL. One-half of the product was dried and subjected to X-ray diffraction which indicated it to be amorphous. The other half was azeotrope dried in isoamyl alcohol, then calcined in dry air at 400° C. for 3 hours. The $N_2$ sorption results were as follows: Total PV=0.46 (saturated), 0.29 (to 300 Å), SA=90, P/Zr atom ratio=1.

Catalyst #4—Solution A was 0.85 mole Al isopropoxide plus 0.24 mole $Zr(OB)_4 \cdot BuOH$ dissolved in 500 mL of n-propanol. Solution B was 22.3 mL (0.325 mole) $H_3PO_4$ (85%) in 200 mL isopropanol. Solution B was added to Solution A to get a mushy white precipitate, which was filtered and dried in a vacuum at 80° C. and then calcined in air at 500° C. for 5 hours. Calculated analysis of the product was as follows: Zr=75%, Al=25%, P/(Al+Zr) atom ratio=1.

Catalyst #5—Solution A was 0.125 mole each of Al isopropoxide and $Zr(OBu)_4 \cdot BuOH$ in 500 mL isopropanol. Solution B was 15.5 mL (0.225 mole) $H_3PO_4$ (85%) in 200 mL isopropanol. Solution B was added to Solution A to get a mushy white precipitate, which was filtered, dried in vacuum at 80° C., and calcined at 500° C. in air for 5 hours. Calculated analysis of the product is as follows: Zr=50%, Al=50%, P/(Al+Zr) atom ratio=0.9.

Catalyst #6—Solution A was 0.125 mole Al isopropoxide plus 0.018 mole of $Zr(OBu)_4 \cdot BuOH$ in 500 mL isopropanol. Solution B was 8.2 mL (0.1184 mole) 85% $H_3PO_4$ in 200 mL isopropanol. Solution B was added to Solution A to get a mushy white precipitate, which was filtered, dried in vacuum at 80° C., calcined at 500° C. in air for 5 hours. $N_2$ sorption results were as follows: Total PV=0.63 (saturated), PV=0.49 (adsorbed), PV=0.58 (desorbed), SA=257 (B.E.T.). Zr=13%, Al=87%, P/(Al+Zr) atom ratio=0.8.

The resulting catalysts were used in combination with dicumene chromium (0) for ethylene polymerization at 93° C. under slurry conditions, e.g., total reactor pressure of 565 psia, when hydrogen was used its partial pressure was 50 psi (0.34 MPa). In all runs, 8 ppm TEB was employed as cocatalyst (reactor additive).

TABLE II

| Run No. | Catalyst | Reactor Additives | Cr Valence | Catalyst Prod. g/g Cat. | Run Time Min. | MI g/10 min. | HLMI g/10 min. | HLMI MI | Density g/cc | (Per 1000 Carbons) Vinyl | Methyl |
|---|---|---|---|---|---|---|---|---|---|---|---|
| 14 | 1 | TEB | 0 | <500 | 60 | | | | | | |
| 15 | 1(a) | TEB | +6 | Dead | | | | | | | |
| 16 | 2 | TEB | 0 | 1080 | 60 | 0 | 0.03 | | 0.9497 | 3.8 | 3.9 |
| 17 | 2 | TEB + H₂ | 0 | 1000 | 60 | 5.6 | | 123 | 0.9517 | 3.7 | 6.2 |
| 18 | 3 | TEB | 0 | 1570 | 60 | 0 | 0.03 | | 0.9481 | 3.3 | 3.8 |
| 19 | 3 | TEB + H₂ | 0 | 590 | 60 | 0.75 | | 181 | 0.9562 | 4.3 | 5.9 |
| 20 | 3(a) | TEB | +6 | Dead | | | | | | | |
| 21 | 2(a) | TEB | +6 | Dead | | | | | | | |
| 22 | 4 | TEB | 0 | 390 | 60 | | | | | | |
| 23 | 4(a) | TEB | +6 | Dead | | | | | | | |
| 24 | 5 | TEB | 0 | 1110 | 50 | 0 | 0.025 (Plugged Off) | | | | |
| 25 | 5 | TEB + H₂ | 0 | 720 | 60 | 462 | | | | | |
| 26 | 6 | TEB | 0 | 1710 | 60 | 0 | 11.5 | | | | |
| 27 | 6 | TEB + H₂ | 0 | 990 | 60 | 112 | | 58 | | | |
| 28 | 6(a) | TEB | +6 | 1905 | 50 | 0.11 | | 453 | | | |
| 29 | 6(a) | TEB + H₂ | +6 | 1255 | 60 | 2.4 | | 190 | | | |
| 30 | 6(a) | TEB + hexene(b) | +6 | 1270 | 60 | 1.1 | | 166 | | | |
| 31 | 100% AlPO₄ | TEB | 0 | 5230 | 60 | 0.14 | | 551 | 0.9538 | 5.2 | 6.0 |
| 32 | 100% AlPO₄ | H₂, no TEB | 0 | 3500 | 60 | 163 | | | 0.9484 | 7.8 | 9.0 |

All supports were slurried in n-pentane, to which was added enough dicumene chromium to equal 1% Cr, then the pentane was evaporated under $N_2$ (Cr never exposed to air).
Notes:
A blank means no determination made.
(a)The dicumene Cr(O) catalyst was oxidized to $Cr^{+6}$ in $O_2$ at 400–500° C. Compare with control Run 13.
(b)5 mL 1-hexene added to reactor, 0.5 volume percent, also increases MI.

These data show in comparison with Control Runs 31 and 32 that zirconium phosphate in combination with aluminum phosphate results in the ability to produce lower melt index polymer than aluminum phosphate alone and further results in a catalyst which is very sensitive to the effects of molecular weight control agents such as hydrogen. Runs 28 to 30 show for instance a melt index of 0.11 which can be increased to 2.4 with the inclusion of hydrogen. This should be compared to Control Run 13 of the previous example so far as a +6 valent chromium compound is concerned which gave a 1.2 melt index with only TEB. Comparison of Runs 16, 18, 24, and 26 with Run 31 shows again the capability of producing lower melt index in accordance with the invention. A comparison of Run 25 with Run 24 shows the enormous hydrogen sensitivity plus allowing the production of polymer having a melt index ranging from 0 to 462 with the same catalyst. Comparison of control Run 32 (which uses only $H_2$) with Runs 17, 19, and 27 (which use both TEB and $H_2$) indicates the catalysts of this invention again have a lower melt index potential even in the presence of $H_2$.

While this invention has been described in detail for the purpose of illustration, it is not to be construed as limited thereby but is intended to cover all changes and modifications within the spirit and scope thereof.

We claim:

1. A catalyst system comprising:
   (a) a catalyst comprising a chromium component on a xerogel base comprising 75–99 mole percent aluminum phosphate and 1 to 25 mole percent of a phosphate of at least one other metal selected from gallium, yttrium, zirconium, lanthanum, neodymium and thorium; and
   (b) an organoboron cocatalyst.

2. A catalyst system according to claim 1 wherein an atom ratio of phosphorus to metal including aluminum is within the range of 0.2:1 to 1:1.

3. A catalyst system according to claim 1 wherein said cocatalyst is a trialkylborane.

4. A catalyst system according to claim 1 wherein said cocatalyst is triethylborane.

5. A catalyst system according to claim 1 wherein an atom ratio of boron to chromium is within the range of 2:1 to 10:1.

6. A catalyst system according to claim 1 wherein the chromium of said chromium component is present in an amount within the range of 0.1 to 5 weight percent based on the weight of said xerogel base.

7. A catalyst system according to claim 1 wherein said metal is gallium.

8. A catalyst system according to claim 1 wherein said metal is yttrium.

9. A catalyst system according to claim 1 wherein said metal is zirconium.

10. A catalyst system according to claim 1 wherein said metal is lanthanum.

11. A catalyst system according to claim 1 wherein said metal is neodymium.

12. A catalyst system according to claim 1 wherein said metal is thorium.

13. A catalyst system according to claim 1 wherein said phosphate of said at least one other metal is present in an amount within the range of 5 to 20 mole percent based on the moles of phosphate of said at least one other metal plus the moles of said aluminum phosphate.

14. A method for making a catalyst system comprising:
   (1) forming a catalyst by
      (a) forming a hydrogel comprising 75–99 mole percent aluminum phosphate and 1 to 25 mole percent of a phosphate of at least one other metal selected from gallium, yttrium, zirconium, lanthanum, neodymium and thorium;
      (b) removing water from said hydrogel to form a xerogel;
      (c) treating said xerogel at an elevated temperature in an oxidizing atmosphere;
      (d) introducing a chromium component either by coprecipitating the chromium component with said hydrogel or adding said chromium component to said hydrogel or adding said chromium component anhydrously to said xerogel prior to said treating in said oxidizing atmosphere; and
   (2) combining said catalyst with an organoboron cocatalyst.

15. A method according to claim 14 wherein said cocatalyst is triethylborane.

16. A method according to claim 14 wherein said hydrogel is formed from a melt of a salt of at least one of said aluminum or said at least one other metal.

* * * * *